(12) United States Patent
Joeng

(10) Patent No.: US 11,345,385 B2
(45) Date of Patent: May 31, 2022

(54) APPARATUS FOR CONTROLLING BEHAVIOR OF AUTONOMOUS VEHICLE AND METHOD THEREOF

(71) Applicants: HYUNDAI MOTOR COMPANY, Seoul (KR); KIA MOTORS CORPORATION, Seoul (KR)

(72) Inventor: Ji Yoel Joeng, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 45 days.

(21) Appl. No.: 16/829,572

(22) Filed: Mar. 25, 2020

(65) Prior Publication Data

US 2021/0039705 A1  Feb. 11, 2021

(30) Foreign Application Priority Data

Aug. 7, 2019 (KR) .......................... 10-2019-0095950

(51) Int. Cl.
*B62D 1/12* (2006.01)
*B62D 1/04* (2006.01)

(52) U.S. Cl.
CPC ........ *B62D 1/12* (2013.01); *B62D 1/04* (2013.01)

(58) Field of Classification Search
CPC ........ B62D 1/12; B62D 1/04; B62D 15/0255; B62D 15/025; B60K 2370/135; B60K 2370/175; B60K 37/06; B60W 30/14; B60W 30/18; B60W 40/10; B60W 50/14; B60W 50/08

See application file for complete search history.

(56) References Cited

U.S. PATENT DOCUMENTS

| | | | |
|---|---|---|---|
| 2019/0049977 A1* | 2/2019 | Dean | G05D 1/0225 |
| 2019/0052637 A1* | 2/2019 | Dean | H04W 12/47 |
| 2019/0061817 A1* | 2/2019 | Mattern | B62D 15/0285 |
| 2019/0225236 A1* | 7/2019 | Hashimoto | B60W 50/08 |
| 2019/0225237 A1* | 7/2019 | Ishikawa | B60W 50/029 |
| 2020/0159274 A1* | 5/2020 | Morehouse | H03H 1/00 |
| 2020/0159277 A1* | 5/2020 | Fung | G05G 9/047 |
| 2020/0188774 A1* | 6/2020 | Fung | A63F 13/212 |

FOREIGN PATENT DOCUMENTS

| | | | |
|---|---|---|---|
| JP | 5393500 B2 * | 1/2014 | |
| KR | 10-2018-0052047 A | 5/2018 | |
| KR | 10-2019-0053422 A | 5/2019 | |
| KR | 10-2019-0053449 A | 5/2019 | |

* cited by examiner

*Primary Examiner* — Jonathan M Dager
*Assistant Examiner* — Jean W Charleston
(74) *Attorney, Agent, or Firm* — Lempia Summerfield Katz LLC

(57) ABSTRACT

An apparatus for controlling a behavior of an autonomous vehicle includes: a joystick that inputs an adjustment value corresponding to an amount of manipulation by a user, and a controller to control the behavior of the autonomous vehicle based on the adjustment value corresponding to the amount of manipulation being input from the joystick.

19 Claims, 6 Drawing Sheets

APPARATUS FOR CONTROLLING BEHAVIOR OF AUTONOMOUS VEHICLE AND METHOD THEREOF

CROSS-REFERENCE TO RELATED APPLICATION

This application claims priority to and the benefit of Korean Patent Application No. 10-2019-0095950, filed on Aug. 7, 2019, the entire contents of which are incorporated herein by reference.

FIELD

The present disclosure relates to technologies of reflecting an adjustment value corresponding to the amount of manipulation of a joystick of a user to control a behavior of an autonomous vehicle.

BACKGROUND

The statements in this section merely provide background information related to the present disclosure and may not constitute prior art.

In general, an autonomous vehicle may autonomously recognize its road environments, may determine driving situations, and may control respective devices therein, including a steering device to move from a current location to a target location along a planned driving route.

An autonomous emergency braking (AEB), a forward collision warning system (FCW), an adaptive cruise control (ACC), a lane departure warning system (LDWS), a lane keeping assist system (LKAS), a blind spot detection (BSD), a rear-end collision warning system (RCW), a smart parking assist system (SPAS), and the like may be loaded into such an autonomous vehicle.

Thus, the autonomous vehicle may recognize surrounding vehicles and a driving lane, may maintain a separation distance from a preceding vehicle while driving, and may maintain a current driving lane or may change the driving lane depending on situations.

Due to this, a user who rids in the autonomous vehicle may do another business rather than driving in a free posture on any seat without the necessity of sitting in the driver's seat. However, because current autonomous driving technology is not perfect to the point of completely excluding the user (driver), the user needs to intervene in autonomous driving depending on situations.

We have discovered that when the user should intervene in autonomous driving, because he or she should move to the driver's seat in the vehicle while driving, there are safety problems.

SUMMARY

In an aspect of the present disclosure, an apparatus and a method for controlling a behavior of an autonomous vehicle determine an intention of a user to manipulate the autonomous vehicle and reflect an adjustment value corresponding to the amount of manipulation of a joystick by the user to control the behavior of the vehicle so as to reduce the sense of incongruity caused by the behavior of the autonomous vehicle which is not stable yet.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a behavior of an autonomous vehicle may include: a joystick that inputs an adjustment value corresponding to an amount of manipulation by a user; and a controller that reflects the adjustment value corresponding to the amount of manipulation of the user, the amount of manipulation being input from the joystick, to control the behavior of the autonomous vehicle.

The controller may reflect a forward adjustment value corresponding to an amount of forward manipulation of the joystick to decrease a separation distance from a preceding vehicle and may reflect a backward adjustment value corresponding to an amount of backward manipulation of the joystick to increase the separation distance from the preceding vehicle.

The controller may reflect a left adjustment value corresponding to an amount of left manipulation of the joystick to decrease a separation distance from a left lane or make a lane change to the left lane and may reflect a right adjustment value corresponding to an amount of right manipulation of the joystick to decrease a separation distance from a right lane or make a lane change to the right lane.

The controller may decrease the separation distance from the left lane, when a left adjustment value corresponding to a left manipulation time of the joystick is less than or equal to a first reference value, and may make the lane change to the left lane, when the left adjustment value is greater than the first reference value.

The controller may decrease the separation distance from the left lane, when a left adjustment value corresponding to the number of times of left manipulation of the joystick is less than or equal to a first reference value, and may make the lane change to the left lane, when the left adjustment value is greater than the first reference value.

The controller may decrease the separation distance from the right lane, when a right adjustment value corresponding to a right manipulation time of the joystick is less than or equal to a first reference value, and may make the lane change to the right lane, when the right adjustment value is greater than the first reference value.

The controller may decrease the separation distance from the right lane, when a right adjustment value corresponding to the number of times of right manipulation of the joystick is less than or equal to a first reference value, and may make the lane change to the right lane, when the right adjustment value is greater than the first reference value.

The apparatus may further include: a second sensor mounted on the joystick to sense a touch of the user, and a third sensor mounted on a steering wheel of the autonomous vehicle to sense a touch of the user.

The controller may reflect the adjustment value corresponding to the amount of manipulation by the user, the amount of manipulation being input from the joystick, and control the behavior of the autonomous vehicle, when a sensing signal is not received from the third sensor and when a sensing signal is received from the second sensor. The controller may ignore the adjustment value corresponding to the amount of manipulation by the user, the amount of manipulation being input from the joystick, when a sensing signal of the second sensor and a sensing signal of the third sensor are both received.

The apparatus may further include a display that displays a driving image of the autonomous vehicle. The controller may control the display based on receiving the adjustment value corresponding to the amount of manipulation by the user from the joystick.

According to another aspect of the present disclosure, a method for controlling a behavior of an autonomous vehicle may include: inputting, by a joystick, an adjustment value corresponding to an amount of manipulation by a user and reflecting, by a controller, the adjustment value corresponding to the amount of manipulation by the user, the amount of manipulation being input from the joystick, to control the behavior of the autonomous vehicle.

Controlling the behavior of the autonomous vehicle may include: reflecting a forward adjustment value corresponding to an amount of forward manipulation of the joystick to decrease a separation distance from a preceding vehicle; reflecting a backward adjustment value corresponding to an amount of backward manipulation of the joystick to increase the separation distance from the preceding vehicle; reflecting a left adjustment value corresponding to an amount of left manipulation of the joystick to decrease a separation distance from a left lane; and reflecting a right adjustment value corresponding to an amount of right manipulation of the joystick to decrease a separation distance from a right lane.

Decreasing the separation distance from the left lane may include: decreasing the separation distance from the left lane, when a left adjustment value corresponding to a left manipulation time of the joystick is less than or equal to a first reference value; and making a lane change to the left lane, when the left adjustment value corresponding to the left manipulation time of the joystick is greater than the first reference value.

Decreasing the separation distance from the left lane may include decreasing the separation distance from the left lane, when a left adjustment value corresponding to the number of times of left manipulation of the joystick is less than or equal to a first reference value and making a lane change to the left lane, when the left adjustment value corresponding to the number of times of left manipulation of the joystick is greater than the first reference value.

In one form, decreasing the separation distance from the right lane may include: decreasing the separation distance from the right lane, when a right adjustment value corresponding to a right manipulation time of the joystick is less than or equal to a first reference value; and making a lane change to the right lane, when the right adjustment value corresponding to the right manipulation time of the joystick is greater than the first reference value.

In another form, decreasing the separation distance from the right lane may include: decreasing the separation distance from the right lane, when a right adjustment value corresponding to the number of times of right manipulation of the joystick is less than or equal to a first reference value; and making a lane change to the right lane, when the right adjustment value corresponding to the number of times of right manipulation of the joystick is greater than the first reference value.

The method may further include: sensing, by a first sensor mounted on each seat of the autonomous vehicle, a location of the user; and controlling, by the controller, a driving device to move the joystick to the sensed location of the user.

In other form, controlling the behavior of the autonomous vehicle may include: controlling the behavior of the autonomous vehicle, when a second sensor mounted on the joystick senses a touch of the user and when a third sensor mounted on a steering wheel of the autonomous vehicle does not sense a touch of the user.

Further areas of applicability will become apparent from the description provided herein. It should be understood that the description and specific examples are intended for purposes of illustration only and are not intended to limit the scope of the present disclosure.

DRAWINGS

Further areas of applicability will become apparent from the description provided herein. It should be understood that the description and specific examples are intended for purposes of illustration only and are not intended to limit the scope of the present disclosure.

Figure 1:
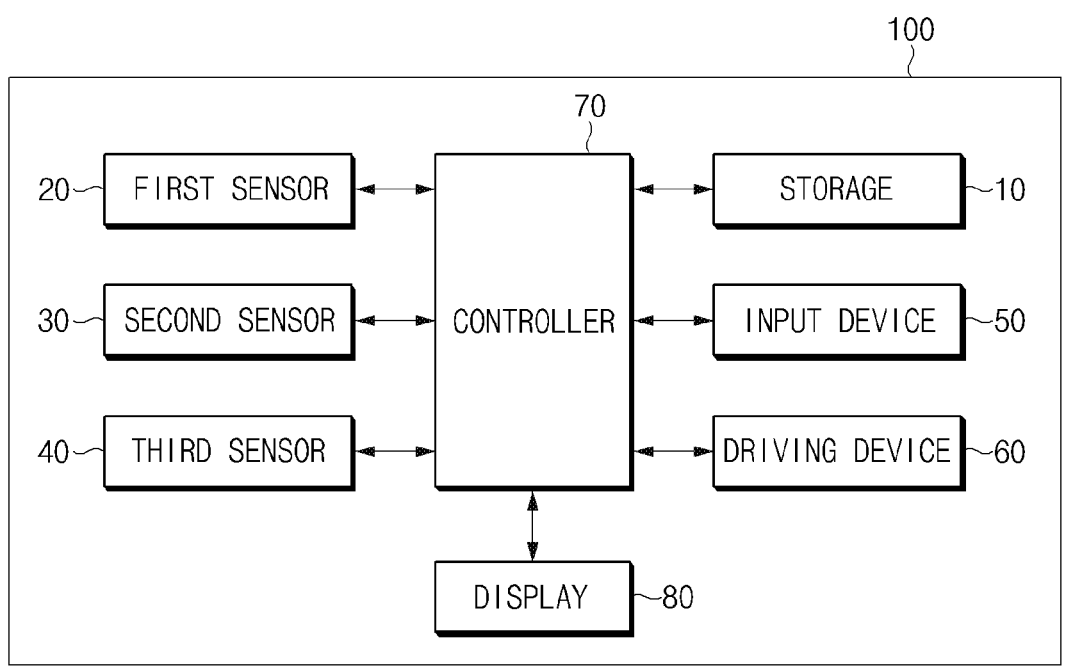
FIG. 1 is a block diagram illustrating a configuration of an apparatus for controlling a behavior of an autonomous vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling a behavior of an autonomous vehicle according to one form of the present disclosure.

As shown in FIG. 1, an apparatus 100 for controlling a behavior of an autonomous vehicle may include: a storage 10, a first sensor 20, a second sensor 30, a third sensor 40, an input device 50, a driving device 60, a controller 70, and a display 80. In this case, the respective components may be combined with each other to form one component and some components may be omitted, depending on a manner which executes the apparatus 100 for controlling the behavior of the autonomous vehicle according to one form of the present disclosure.

Seeing the respective components, first of all, the storage 10 may store various logics, algorithms, and programs, which are desired in a process of determining an intention of a user to manipulate a behavior of the autonomous vehicle and reflecting an adjustment value corresponding to manipulation by the user to control the behavior of the autonomous vehicle.

The storage 10 may store an adjustment value according to the amount of manipulation by the user. For example, the storage 10 may store a forward adjustment value corresponding to the amount of forward manipulation (e.g., the number of time of forward manipulation, a forward manipulation time, or the like) of a joystick, a backward adjustment value corresponding to the amount of backward manipulation of the joystick, a left adjustment value corresponding to the amount of left manipulation of the joystick, and a right adjustment value corresponding to the amount of right manipulation of the joystick. In this case, the joystick is exemplified, but, although any of a knob type, a dial type, and/or a button type is applied, the storage 10 may store an adjustment value corresponding to each type.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The first sensor 20 may be a seat sensor and may be mounted on the driver's seat to sense whether the user sits in the driver's seat.

The first sensor 20 may be plural in number to be mounted on respective seats of the vehicle. In this case, the controller 70 may detect whether the user sits in any seat based on sensing signals of the plurality of first sensors 20.

The second sensor 30 may be implemented as, for example, a capacitive sensor and may be mounted on the joystick to sense whether the user touches the joystick.

The third sensor 40 may be implemented as, for example, a capacitive sensor and may be mounted on a steering wheel of the vehicle to sense whether the user touches the steering wheel.

The input device 50 may be implemented as any one of a joystick type, a knob type, a dial type, and/or a button type and may input an adjustment value corresponding to the amount of manipulation of the user.

For example, when implemented as the joystick type, the input device 50 may input a forward adjustment value corresponding to the amount of forward manipulation (e.g., the number of times of forward manipulation, a forward manipulation time, or the like) of the joystick, a backward adjustment value corresponding to the amount of backward manipulation of the joystick, a left adjustment value corresponding to the amount of left manipulation of the joystick, and a right adjustment value corresponding to the amount of right manipulation of the joystick.

The driving device 60 may be implemented as an actuator to move the input device 50 on a rail under control the controller 70.

The controller 70 may perform overall control such that the respective components normally perform their own functions. Such a controller 70 may be implemented in the form of hardware or software or in the form of a combination thereof. In one form, the controller 70 may be implemented as, but not limited to, a microprocessor.

Particularly, the controller 70 may perform a variety of control in a process of determining an intention of the user to manipulate a behavior of the autonomous vehicle and reflecting an adjustment value corresponding to the amount of manipulation by the user to control the behavior of the autonomous vehicle.

The controller 70 may control the driving device 60 to move the input device 50 to a corresponding location based on the sensing signal of the first sensor 20. In other words, the controller 70 may control the driving device 60 to move the input device 50 to a location corresponding to the sensing signal of the first sensor 20.

The controller 70 may be a module which controls a behavior of the autonomous vehicle based on autonomous driving technology. Because the technology itself of controlling the behavior of the autonomous vehicle (i.e., the technology itself of autonomously driving the vehicle) is well-known and commonly used, no detailed description thereof will be provided.

The controller 70 may reflect an adjustment value corresponding to the amount of manipulation of the user, which is input through the input device 50, to control a behavior of the autonomous vehicle.

For example, the controller 70 may reflect a forward adjustment value corresponding to the amount of forward manipulation of the joystick to narrow a separation distance from a preceding vehicle. The controller 70 may reflect a backward adjustment value corresponding to the amount of backward manipulation of the joystick to widen a separation distance from a preceding vehicle. The controller 70 may reflect a left adjustment value corresponding to the amount of left manipulation of the joystick to narrow a separation distance from a left lane or make a lane change to the left lane. The controller 70 may reflect a right adjustment value corresponding to the amount of right manipulation of the joystick to narrow a separation distance from a right lane or make a lane change to the right lane.

Herein, when the left adjustment value corresponding to the amount of left manipulation (e.g., the number of times of left manipulation, the left manipulation time, or the like) of the joystick is less than or equal to a first reference value, the controller 70 may narrow the separation distance from the left lane. When the left adjustment value is greater than the first reference value, the controller 70 may make a lane change to the left lane.

For example, when a left adjustment value corresponding to a left adjustment time of the joystick is less than or equal to the first reference value, the controller 70 may narrow a separation distance from a left lane. When the left adjustment value corresponding to the left adjustment time of the joystick is greater than the first reference value, the controller 70 may make a lane change to the left lane.

For another example, when a left adjustment value corresponding to the number of times of left manipulation of the joystick is less than or equal to the first reference value, the controller 70 may narrow a separation distance from a left lane. When the left adjustment value corresponding to the number of times of left manipulation of the joystick is greater than the first reference value, the controller 70 may make a lane change to the left lane.

Furthermore, when the right adjustment value corresponding to the amount of right manipulation (e.g., the number of times of right manipulation, the right manipulation time, or the like) of the joystick is less than or equal to the first reference value, the controller 70 may narrow the separation distance from the right lane. When the right adjustment value is greater than the first reference value, the controller 70 may make a lane change to the right lane.

For example, when a right adjustment value corresponding to a right adjustment time of the joystick is less than or equal to the first reference value, the controller 70 may narrow a separation distance from a right lane. When the right adjustment value corresponding to the right adjustment time of the joystick is greater than the first reference value, the controller 70 may make a lane change to the right lane.

For another example, when a right adjustment value corresponding to the number of times of right manipulation of the joystick is less than or equal to the first reference value, the controller 70 may narrow a separation distance from a right lane. When the right adjustment value corresponding to the number of times of right manipulation of the joystick is greater than the first reference value, the controller 70 may make a lane change to the right lane.

The controller 70 may determine an intention of the user to manipulate a behavior of the autonomous vehicle and may reflect an adjustment value corresponding to the amount of manipulation by the user, when there is the intention of the user to manipulate the behavior of the autonomous vehicle, to control the behavior of the autonomous vehicle. In other words, the controller 70 may control a steering torque and a desired acceleration of the autonomous vehicle based on an adjustment value corresponding to the amount of manipulation by the user.

When the sensing signal is received from the second sensor 30, the controller 70 may determine that there is the intention of the user to manipulate the behavior of the autonomous vehicle. In this case, when both the sensing signal of the second sensor 30 and the sensing signal of the third sensor 40 are received, the controller 70 may prioritize the sensing signal of the third sensor 40 and may determine that the sensing signal of the second sensor 30 is generated by a passenger.

When receiving the adjustment value corresponding to the amount of manipulation of the user from the joystick, the controller 70 may control the display 80 to display a driving image obtained by a camera (not shown) loaded into the autonomous vehicle. In this case, the display 80 may be implemented as a window display. For reference, the window display may be a display which has a window on which special particles are coated. When electricity is applied to the window display, the window display may block light from the outside. The window display may be a transparent window in a manual driving mode, whereas the window display may be used as a screen in an autonomous driving mode because it becomes dark as if a dark film is attached to the window display.

Figure 2:
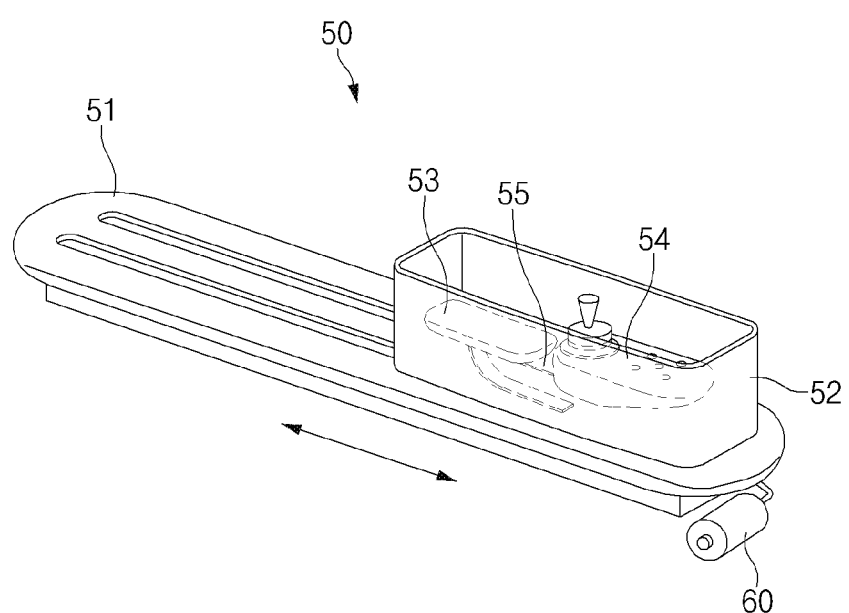
FIG. 2 is a drawing illustrating a structure of an input device included in an apparatus for controlling a behavior of an autonomous vehicle.

FIG. 2 is a drawing illustrating a structure of an input device included in an apparatus for controlling a behavior of an autonomous vehicle according to one form of the present disclosure.

As shown in FIG. 2, an input device 50 included in the apparatus for controlling the behavior of the autonomous vehicle may include a rail 51, a housing 52, a support 53, a joystick 54, and a hinge 55.

First of all, the rail 51 may be a path on which the housing 52 is moved. The housing 52 may reciprocate on the rail 51 by a driving force of a driving device 60 of FIG. 1.

The support 53 and the joystick 54 may be located in the housing 52. In this case, the support 53 may be connected with the joystick 54 through the hinge 55. The support 53 may pop up in a generally well-known pop-up manner. In other words, when a user pushes the support 53 in the housing 52, the support 53 may be fixed in the housing 52 by a lock. When the user unlocks the lock, the support 53 may automatically pop up by an elastic body.

Herein, a cover of the housing 52 is not described, but may be implemented in various manners, for example, a sliding-door-type cover, an open-type cover, and the like, which are generally well known.

In one form of the present disclosure, the automatic manner in which the housing 52 moves on the rail 51 by the driving device 60 is described, but a manual manner in which the user grasps the housing 52 in one hand to move the housing 52 may be implemented as another form of the present disclosure.

Figure 3A:
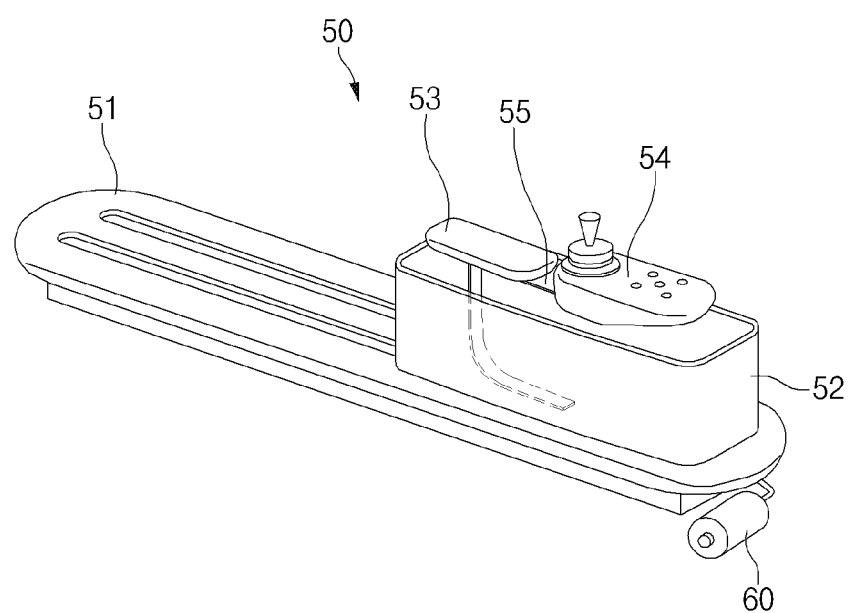
FIGS. 3A and 3B are drawings respectively illustrating a detailed structure of an input device included in an apparatus for controlling a behavior of an autonomous vehicle.
Figure 3B:
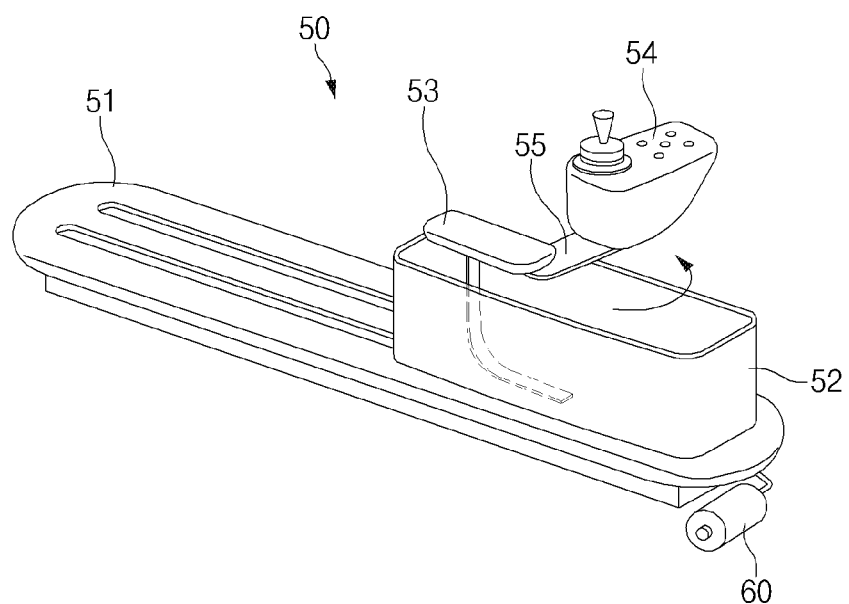

FIGS. 3A and 3B are drawings respectively illustrating a detailed structure of an input device included in an apparatus for controlling a behavior of an autonomous vehicle according to one form of the present disclosure.

As shown in FIGS. 3A and 3B, a joystick 54 may rotate in a left/right direction by a hinge 55. In other words, a user may grasp the joystick 54 in one hand to rotate the joystick 54 in a left/right direction.

Thus, although the user sits in any seat of an autonomous vehicle, he or she may conveniently use the joystick 54.

A plurality of buttons used to control a behavior of the autonomous vehicle may be provided in the joystick 54.

Figure 4:
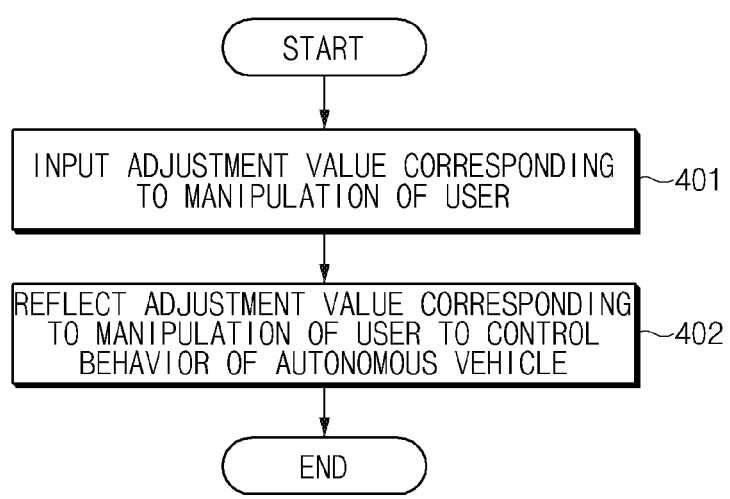
FIG. 4 is a flowchart illustrating a method for controlling a behavior of an autonomous vehicle.

FIG. 4 is a flowchart illustrating a method for controlling a behavior of an autonomous vehicle according to one form of the present disclosure.

First of all, in operation 401, a joystick may input an adjustment value corresponding to the amount of manipulation (e.g., the number of times of manipulation, a manipulation time, or the like) by a user. In other words, the user may manipulate the joystick to assist in a behavior (e.g., steering, deceleration, or acceleration) of the autonomous vehicle.

In operation 402, a controller 70 of FIG. 1 may reflect the adjustment value corresponding to the amount of manipulation by the user, which is input from the joystick, to control a behavior of the autonomous vehicle. In other words, the controller 70 may basically control the behavior of the autonomous vehicle based on autonomous driving technology, but, when there is manipulation of the user, may reflect an adjustment value corresponding to the amount of manipulation by the user to control a behavior of the autonomous vehicle. As a result, the adjustment value corresponding to the amount of manipulation by the user may be used to assist in the behavior of the autonomous vehicle.

Figure 5:
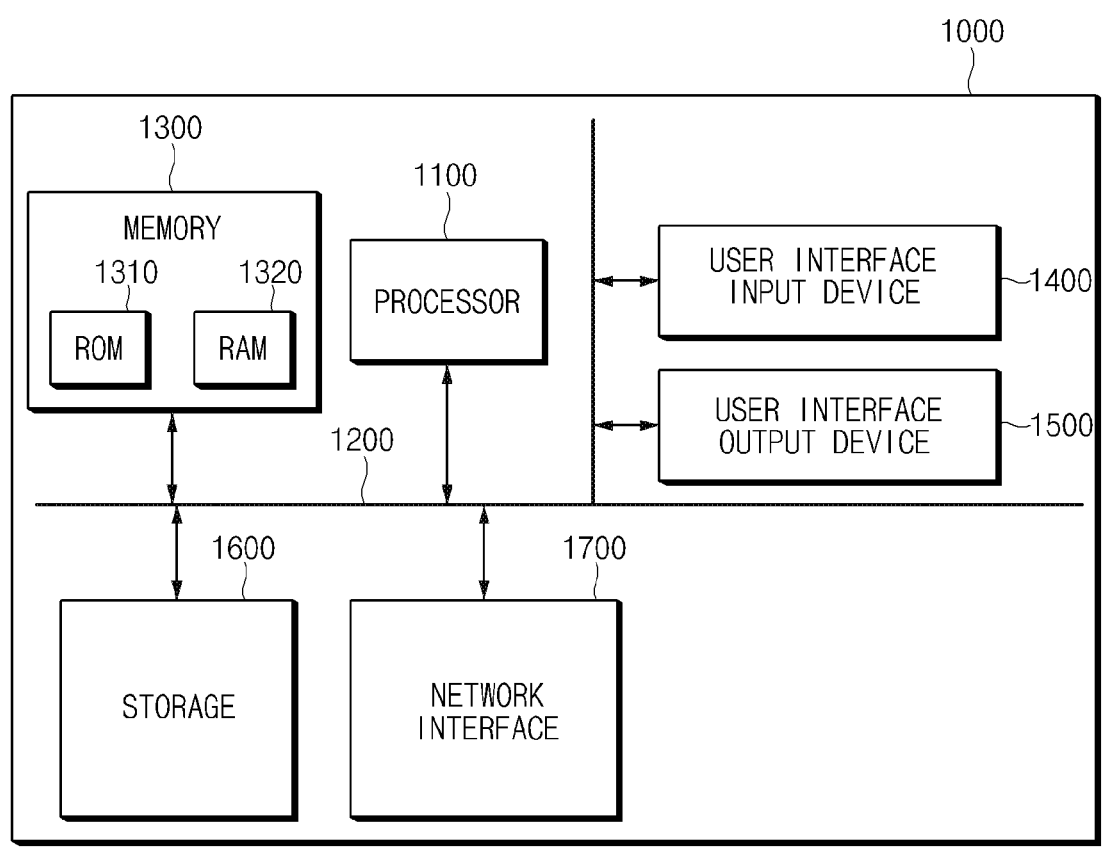
FIG. 5 is a block diagram illustrating a computing system for executing a method for controlling a behavior of an autonomous vehicle.

FIG. 5 is a block diagram illustrating a computing system for executing a method for controlling a behavior of an autonomous vehicle according to one form of the present disclosure.

Referring to FIG. 5, the method for controlling the behavior of the autonomous vehicle may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus for controlling the behavior of the autonomous vehicle and the method thereof may determine an intention of the user to manipulate the behavior of the autonomous vehicle and may reflect an adjustment value corresponding to the amount of manipulation of a joystick by the user to control the behavior of the vehicle, thus reducing the sense of incongruity caused by the behavior of the autonomous vehicle which is not stable yet.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for controlling a behavior of an autonomous vehicle, the apparatus comprising:
a joystick configured to input an adjustment value corresponding to an amount of manipulation by a user; and
a controller configured to:
control the behavior of the autonomous vehicle based on the adjustment value received from the joystick,
make a lane change based on a manipulation time of the joystick or a number of times of manipulation of the joystick,
decrease a separation distance from a left lane when a left adjustment value corresponding to a left manipulation time of the joystick is less than or equal to a first reference value, and
make the lane change to the left lane when the left adjustment value is greater than the first reference value.

2. The apparatus of claim 1, wherein the controller is configured to:
reflect a forward adjustment value corresponding to an amount of forward manipulation of the joystick to decrease a separation distance from a preceding vehicle and
reflect a backward adjustment value corresponding to an amount of backward manipulation of the joystick to increase the separation distance from the preceding vehicle.

3. The apparatus of claim 1, wherein the controller is configured to:
reflect a left adjustment value corresponding to an amount of left manipulation of the joystick to decrease the separation distance from the left lane or make the lane change to the left lane, and
reflect a right adjustment value corresponding to an amount of right manipulation of the joystick to decrease a separation distance from a right lane or make the lane change to the right lane.

4. The apparatus of claim 3, wherein the controller is configured to:
decrease the separation distance from the left lane when a left adjustment value corresponding to a number of times of left manipulation of the joystick is less than or equal to a first reference value, and
make the lane change to the left lane when the left adjustment value is greater than the first reference value.

5. The apparatus of claim 3, wherein the controller is configured to:
decrease the separation distance from the right lane when a right adjustment value corresponding to a right manipulation time of the joystick is less than or equal to a first reference value, and
make the lane change to the right lane when the right adjustment value is greater than the first reference value.

6. The apparatus of claim 3, wherein the controller is configured to:
decrease the separation distance from the right lane when a right adjustment value corresponding to a number of times of right manipulation of the joystick is less than or equal to a first reference value, and
make the lane change to the right lane when the right adjustment value is greater than the first reference value.

7. The apparatus of claim 1, further comprising:
a second sensor mounted on the joystick and configured to sense a touch of the user; and
a third sensor mounted on a steering wheel of the autonomous vehicle and configured to sense a touch of the user.

8. The apparatus of claim 7, wherein the controller is configured to:
reflect the adjustment value corresponding to the amount of manipulation by the user, the amount of manipulation being input from the joystick, to control the behavior of the autonomous vehicle when a sensing signal is not received from the third sensor and when a sensing signal is received from the second sensor.

9. The apparatus of claim 7, wherein the controller is configured to: ignore the adjustment value corresponding to the amount of manipulation by the user, the amount of manipulation being input from the joystick, when a sensing signal of the second sensor and a sensing signal of the third sensor are both received.

10. The apparatus of claim 1, further comprising:
a display configured to display a driving image of the autonomous vehicle.

11. The apparatus of claim 10, wherein the controller is configured to control the display based on receiving the adjustment value corresponding to the amount of manipulation by the user from the joystick.

12. A method for controlling a behavior of an autonomous vehicle, the method comprising:
inputting, by a joystick, an adjustment value corresponding to an amount of manipulation by a user; and
controlling, by a controller, the behavior of the autonomous vehicle based on the adjustment value received from the joystick,
wherein controlling the behavior of the autonomous vehicle includes:
making, by the controller, a lane change based on a manipulation time of the joystick or a number of times of manipulation of the joystick;
decreasing a separation distance from a left lane when a left adjustment value corresponding to a left manipulation time of the joystick is less than or equal to a first reference value; and
making the lane change to the left lane when the left adjustment value corresponding to the left manipulation time of the joystick is greater than the first reference value.

13. The method of claim 12, wherein controlling the behavior of the autonomous vehicle includes:
reflecting a forward adjustment value corresponding to an amount of forward manipulation of the joystick to decrease a separation distance from a preceding vehicle;
reflecting a backward adjustment value corresponding to an amount of backward manipulation of the joystick to increase the separation distance from the preceding vehicle;
reflecting a left adjustment value corresponding to an amount of left manipulation of the joystick to decrease a separation distance from a left lane; and
reflecting a right adjustment value corresponding to an amount of right manipulation of the joystick to decrease a separation distance from a right lane.

14. The method of claim 13, wherein decreasing the separation distance from the left lane includes:
decreasing the separation distance from the left lane when a left adjustment value corresponding to a left manipulation time of the joystick is less than or equal to a first reference value; and
making the lane change to the left lane when the left adjustment value corresponding to the left manipulation time of the joystick is greater than the first reference value.

15. The method of claim 13, wherein decreasing the separation distance from the left lane includes:
decreasing the separation distance from the left lane when a left adjustment value corresponding to a number of times of left manipulation of the joystick is less than or equal to a first reference value; and
making the lane change to the left lane when the left adjustment value corresponding to the number of times of left manipulation of the joystick is greater than the first reference value.

16. The method of claim 13, wherein decreasing the separation distance from the right lane includes:
decreasing the separation distance from the right lane when a right adjustment value corresponding to a right manipulation time of the joystick is less than or equal to a first reference value; and
making the lane change to the right lane when the right adjustment value corresponding to the right manipulation time of the joystick is greater than the first reference value.

17. The method of claim 13, wherein decreasing the separation distance from the right lane includes:
decreasing the separation distance from the right lane when a right adjustment value corresponding to a number of times of right manipulation of the joystick is less than or equal to a first reference value; and
making the lane change to the right lane when the right adjustment value corresponding to the number of times of right manipulation of the joystick is greater than the first reference value.

18. The method of claim 12, further comprising:
sensing, by a first sensor mounted on each seat of the autonomous vehicle, a location of the user; and
controlling, by the controller, a driving device to move the joystick to the sensed location of the user.

19. The method of claim 12, wherein controlling the behavior of the autonomous vehicle includes:
controlling the behavior of the autonomous vehicle when a second sensor mounted on the joystick senses a touch of the user and when a third sensor mounted on a steering wheel of the autonomous vehicle does not sense a touch of the user.

* * * * *